Patented June 28, 1927.

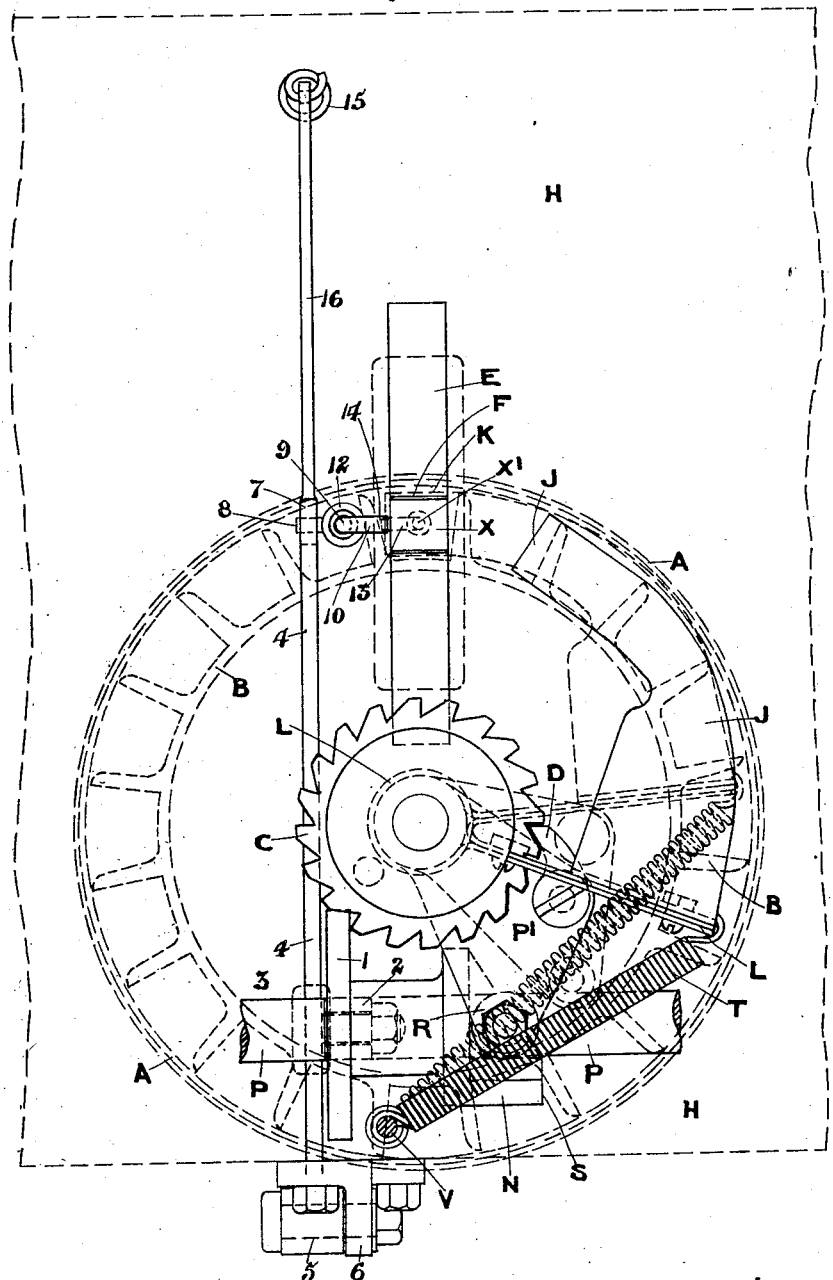

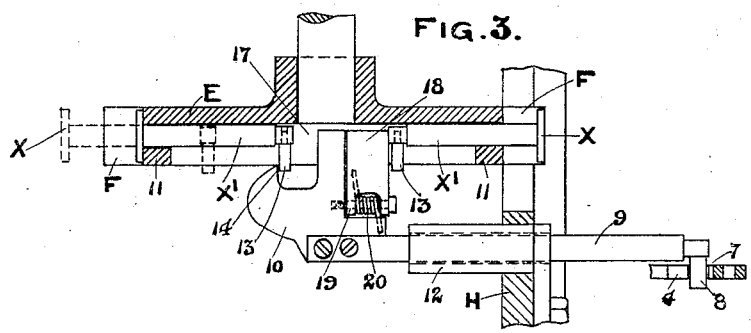
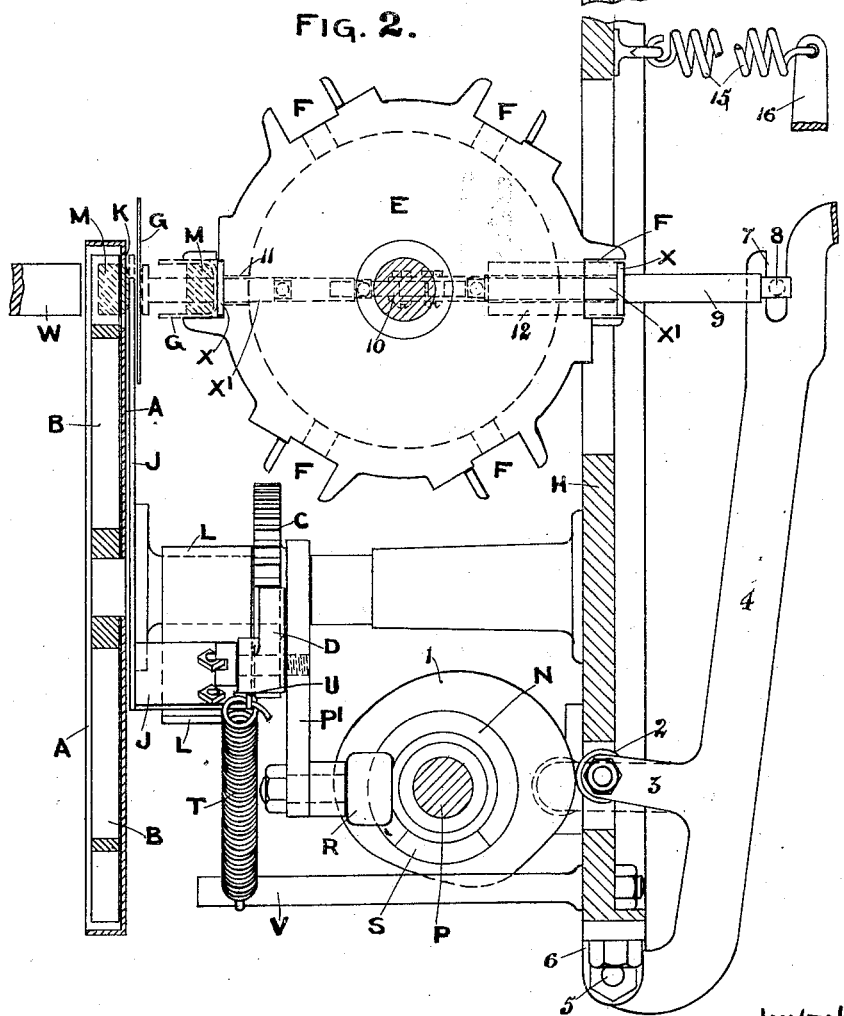

1,634,229

UNITED STATES PATENT OFFICE.

HARRY BRADWELL, OF HALIFAX, ENGLAND, ASSIGNOR TO JOHN MACKINTOSH AND SONS, LIMITED, OF HALIFAX, ENGLAND, A BRITISH COMPANY.

WRAPPING MACHINE FOR WRAPPING OR PARCELING TOFFEE, CHOCOLATE, OR THE LIKE.

Application filed May 19, 1924, Serial No. 714,352, and in Great Britain May 24, 1923.

This invention relates to improvements in the means for transferring the article to be wrapped, from the feed wheel to the parceling or mould-wheel in wrapping machines of the kind described in Patent No. 1,118,468, and British Patent No. 497 of 1914, and my object is to dispense with the use of spring jaws for holding the article in the chute, also spring controlled doors serving as a chute, and the chute itself, mentioned in the aforesaid patent specification and in British patent specification 497 of 1914, and to employ improved means whereby the article to be wrapped is delivered on to each parcel support or platform of the parceling wheel, before it leaves the usual outlet in the fixed flanged disc containing the feed wheel, where it is engaged by the plunger sufficient only to prevent it falling off such platform or shifting its position thereon, and subsequently lowered with the wrapper previously supplied, into the corresponding recess in the mould-wheel by the subsequent synchronized action of both plunger and parcel support. In this manner a more delicate confectionery than toffee, such as confections having a coating of chocolate, may be successfully wrapped without the chocolate section or coating being in any way damaged during the operation; the confection being kindly held approximately from the time it is delivered by the feed wheel into the disc outlet until it is lodged in the mould wheel for wrapping. By these means and in this manner considerable economy is effected in the wrapping of toffee, chocolate coated confections, or the like.

According to my invention I employ a suitable movable or oscillating platform composed of preferably sheet metal operating in close proximity to the underside of the flanged disc containing the feed wheel, above the mould or parceling wheel, adapted at the limit of its forward movement to close the outlet in the said disc and to receive thereon an article to be wrapped simultaneously with the delivery of such article thereto by the feed wheel. The reverse movement of this platform which is effected more quickly than the forward movement, leaves the article upon one of the parcel supports or platforms of the parceling wheel which has in the meantime been raised into a position close under the aforesaid oscillating platform, to receive it. The customary plunger in its descent engages the article upon the parcel support immediately following the return of the oscillating platform but with only sufficient effort to prevent the same and its wrapper beneath from shifting their positions thereon, when both plunger and parcel support are subsequently operated to descend at corresponding speeds to lower both article and its wrapper into the awaiting recess in the parceling wheel where the article is wrapped with such wrapper in the manner and by the means shown and described in patent specification No. 1,118,468.

The oscillating platform is operated simultaneously with the feed wheel, by cam, ratchet wheel, pawl, and lever or the like, which also operate to release the same at the end of its forward movement, when it is returned as desired by the action of a spring.

The raising of the parcel supports or platforms out of the recesses or pockets in the parceling wheel, and the ejecting of a parcel or a wrapped toffee, are effected by a pivoted arm or bell-crank lever one arm of which carries a roller adapted to be engaged by a cam upon the front shaft. The loose end of this lever is preferably forked and is adapted to engage a stud upon a vertical spindle to raise or lower the latter. Attached to the opposite end of the spindle is an arm or plate having a finger or claw projection thereon adapted to engage a projecting stud upon each of the parcel support spindles to lower the parcel support after receiving an article to be wrapped, into the corresponding recess in the parceling wheel, while another portion of the said arm engages the spindle itself when requiring to raise its parcel support into position for receiving the article, and another face of this portion of the arm also engages the opposing spindle to eject a wrapped article from the said wheel. This arm is preferably made in two sections the lower section effecting the ejecting operation hinging upon the upper section, and is controlled by a spring. This flexible portion of the aforesaid arm enables the same to clear the parcel support spindles during each intermittent forward movement of the parceling wheel.

A rubber or other suitable pad, facing, or lining may be attached to either the plunger or the parcel platform, or to both, as desired, to serve as a cushion and still further lessen the possibility of damage to the article to be wrapped, by the grip thereon of the plunger and platform before mentioned.

I attain these objects by the means illustrated in the accompanying drawings, in which:—

Fig. 1, is a plan view in broken lines of a portion of the table, also the feed wheel and the flanged disc containing same, of the wrapping machine shown and described in the before-mentioned patent specification No. 1,118,468, showing in full lines my improvements applied thereto, and also in broken lines the position of the oscillatory platform on the completion of its forward movement; Fig. 2 is a side elevation partly in section of the mechanism shown at Fig. 1; and Fig. 3 is a sectional side view of the parceling wheel and my improved mechanism for raising and lowering the parcel supports mounted therein, showing in broken lines the position of the parcel support for receiving an article and its wrapper on the withdrawal of the oscillatory platform; in both Figs. 2 and 3, the top of the machine is to the left.

Referring more particularly to Figs. 1 and 2. A is the fixed flanged disc or tray within which is situated the feed wheel B rotated intermittently by the ratchet wheel C, and pawl D. E is the mould or parceling wheel containing pockets or recesses F for receiving the article M and its wrapper G, prior to the parceling thereof, and H is the table of the machine; all being common to the device covered by the aforesaid patent.

J is the oscillatory platform or arm operating in close proximity to the underside of A, and adapted on completing its forward movement to close the customary outlet K in the latter. This platform is attached to an arm L mounted upon the boss of the wheel C and adapted to move integrally with the same, the arrangement being such that as one of the spaces in the wheel B encroaches upon the said outlet K, the platform J keeps pace therewith and when the confection M is finally delivered thereto the latter is closed by the said platform which thus receives the confection and supports the same for the time being.

This movement of the platform J is effected simultaneously with each operation of the wheel B, but in this case the cam N on the cam shaft P is so constructed, that, following upon the completion of each feed movement, the lever P¹ carrying the pawl D is released by the loosely mounted roller R thereon moving off the nose S of said cam and falling on to the bottom plane thereof, allowing the spring T connected at one end to a projection U on J or L, and at the other end to the pillar V, to quickly return the lever P¹, pawl D, and platform J to their normal positions, similarly withdrawing the latter from beneath the confection thereon.

During this feed movement one of the recesses or pockets F in the parceling wheel E has been brought into position beneath the outlet K and the corresponding parcel support X, as shown in dotted lines at Fig. 2, is raised so as to be in close proximity to the platform J aforesaid with a wrapper positioned thereon, so that upon the withdrawal or return movement of the said platform the confection is left upon the said support. The plunger W now descends into engagement with the article M and immediately this takes place, the parcel support is also operated to fall at a corresponding speed, and both the article and its wrapper are in this manner lowered into the pocket F set to receive them, without the least possibility of damage to the confection in transit.

The means employed to raise and lower the said parcel support, also operates during the latter movement to engage the spindle X¹ of the opposing parcel support, and should the corresponding pocket contain a parcel, eject the same. The plunger is raised after depositing the article and its wrapper within the pocket F as before described, and the mould-wheel given the next feed movement for the sides of said wrapper to be laid over each other and the ends twisted in the manner and by the mechanism set forth in the aforesaid specification. Each movement of the wheel E positions one of the pockets F below the outlet K, and is followed by the raising of the corresponding parcel support therein, and the operation of the platform J, as and for the purposes above described.

With reference to Figs. 2 and 3, and in order to position at the proper time each parcel support with wrapper ready to receive the article to be wrapped upon the return movement of the platform J, I employ a further cam 1 upon the shaft P engaging a runner 2 upon an arm 3 of a bell-crank lever 4 pivoting at 5 upon a bracket 6 secured to the table H.

The lever 4 is provided with a fork 7 engaging a stud or projection 8 upon a vertical spindle 9, upon which is mounted an arm 10 adapted to engage the spindle of the parcel support receiving the article to be wrapped, to raise or lower the same in its sleeve or bearing 11 in the parceling wheel E, and to operate the spindle of the opposing support for the purpose of ejecting from said wheel a wrapped article. The spindle 9 operates in a suitable sleeve or bearing 12 secured to the table, and the cam 1 is also shaped and arranged relatively with the normal cam and lever mechanism not shown, operating the plunger, that the continued descent of the plunger immediately following its engagement with the article upon the parcel support, synchronizes with the lowering of the latter, and corresponds in speed, thus little or no pressure is imposed upon the confection by either while it is being lowered into the pocket.

The lever 4 has a further arm 16 to which is secured one end of a spring 15, the other end being secured to the table. The operation of the said lever by the cam 1 is against the action of this spring, and is for lowering the parcel support and article thereon into the wheel E. Each spindle $X^1$ has a projection or stud 13 near one end, which is engaged by a claw projection 14 upon the arm 10 for this purpose; and simultaneously with the engagement of the claw 14 as aforesaid, another part 18 of the arm 10 engages the end of the opposing spindle and operates to eject the wrapped article from the corresponding pocket in the parceling wheel, while on the return movement of said lever by spring 15, another part 17 of said arm engages the next spindle brought into position by a further movement of the wheel E, to quickly raise the same with its parcel support into position for the latter to receive the next confection and wrapper, as before described.

The arm 10 is preferably constructed in two sections, the section 18 hinging at 19 upon the fixed part 17 and is controlled in its movement by the spring 20. The part 18 is adapted to move on its hinges so as to clear the spindles $X^1$ of the parcel supports during the forward movements of the parceling wheel.

What I claim as my invention, and desire to secure by Letters Patent, is:—

1. In a wrapping machine, the combination with a support for the articles to be wrapped provided with a delivery opening, parceling means positioned beneath said opening, and intermittingly acting means for feeding a series of articles on the support to said delivery opening successively, of a platform movable with each movement of the article feeding means to a position between the delivery opening of the support and the parceling means, and means for automatically withdrawing said platform from beneath said opening between the step by step movements of the feeding means.

2. In a wrapping machine, the combination with a support for the articles to be wrapped provided with a delivery opening, parceling means positioned beneath said opening, and rotary, intermittingly acting, means for feeding a series of articles on the support to said delivery opening successively, of a pivotally mounted platform movable with each movement of said feeding means to a position between the delivery opening of the support and the parceling means, and means for automatically withdrawing said platform from beneath the said opening between the step by step movements of the feeding means.

3. In a wrapping machine, the combination with a support for the articles to be wrapped provided with a delivery opening, parceling means positioned beneath said opening, and rotary, intermittingly acting, means for feeding a series of articles on the support to said delivery opening successively, of a platform oscillatable about the axis of said feeding means and movable with each movement of said feeding means to a position between the delivery opening of the support and the parceling means, and means for automatically withdrawing said platform from beneath the said opening between the step by step movements of the feeding means.

4. In a wrapping machine, the combination with a support for the articles to be wrapped provided with a delivery opening, parceling means positioned beneath said opening, and a wheel-like device for feeding a series of articles on the support to said delivery opening successively, a ratchet connected to said wheel concentric with the axis thereof, a pivotally mounted pawl carrier provided with a pawl engaging the ratchet, and means for moving the pawl carrier to intermittingly actuate the feed wheel ratchet, of a platform connected with the pawl carrier and movable thereby at each actuation of the ratchet to a position between the delivery opening of the support and the parceling means and adapted to be withdrawn from beneath said opening on each return movement of the pawl carrier.

5. In a wrapping machine, the combination of a support for the articles to be wrapped provided with a delivery opening, a parceling means including a wheel provided with pockets adapted to be successively moved into alignment with said delivery opening, an intermittingly acting feed means for feeding a series of articles on the support to said opening successively, a platform adapted to be positioned between said opening and the aligned pocket in the parceling wheel at each movement of the feed means, and a spring for withdrawing said platform from beneath said opening between the step by step movements of the feed means.

6. In a wrapping machine, the combination of a support for the articles to be wrapped provided with a delivery opening, a parceling means including a wheel provided with peripheral pockets adapted to be successively brought into alignment with said delivery opening, an intermittingly acting feed means for feeding a series of articles on the support to said opening successively, a platform adapted to be positioned between said opening and the adjacent pocket of the parceling wheel at each movement of the feed means and to be withdrawn from alignment with said opening between the step by step movements of the feed means, a plunger within each pocket of the parceling wheel, a plunger above and adapted to reciprocate through the said delivery opening, and means for simultaneously moving the last said plunger and the plunger of the pocket of the parceling wheel that is in alignment with said delivery opening in the same direction, for the purpose described.

7. In combination with a wrapping machine of the class described comprising a rotary feed wheel, an oscillatory platform associated therewith, a plunger positioned above said feed wheel and platform, a parceling wheel having pockets therein and having a plurality of parcel supports, of means for actuating the parcel supports comprising an arm mounted upon a vertically movable shaft, said arm having a projection adapted to engage a parcel support and move it into position beneath the oscillatory platform, and having another portion adapted to engage the parcel support and return it to its position within the parceling wheel on the downward movement of the shaft, said arm also having a pivoted section adapted to engage a parcel support diametrically opposite said first mentioned parcel support and to eject a previously wrapped article positioned in its associated pocket during the retracting movement of the shaft, said pivoted section being provided to permit rotation of the parceling wheel relative to the parcel support actuating arm.

8. In combination with a wrapping machine of the class described comprising associated feed and parceling wheels arranged in close proximity, of an oscillatory platform positioned between said associated wheels, means for supporting the platform, a ratchet wheel and pawl device for positively moving said platform to its operative position, and yieldable means associated with the platform for returning said platform to inoperative position.

9. In combination with a wrapping machine of the class described comprising associated feed and parceling wheels arranged in close proximity, of movable means positioned between the associated wheels adapted to receive and temporarily support an article to be wrapped, means comprising a ratchet and pawl construction associated with said movable supporting means for positively moving at predetermined intervals the supporting means to its operative position, and a spring associated with said movable supporting means for quickly returning said means to its inoperative position.

In testimony whereof I have signed my name to this specification.

HARRY BRADWELL.